(12) United States Patent
Popovic et al.

(10) Patent No.: US 8,254,367 B2
(45) Date of Patent: Aug. 28, 2012

(54) METHOD AND SYSTEM FOR SYNCHRONIZATION IN COMMUNICATION SYSTEM

(75) Inventors: Branislav Popovic, Solna (SE); Oskar Mauritz, Johanneshov (SE)

(73) Assignee: Huawei Technologies Co., Ltd., Shenzhen (CN)

(*) Notice: Subject to any disclaimer, the term of this patent is extended or adjusted under 35 U.S.C. 154(b) by 808 days.

(21) Appl. No.: 12/175,685

(22) Filed: Jul. 18, 2008

(65) Prior Publication Data

US 2008/0318567 A1 Dec. 25, 2008

Related U.S. Application Data

(63) Continuation of application No. PCT/CN2006/000077, filed on Jan. 18, 2006.

(51) Int. Cl.
*H04J 3/06* (2006.01)
(52) U.S. Cl. ......................................................... 370/350
(58) Field of Classification Search .................. 370/350, 370/208, 503; 455/456.1
See application file for complete search history.

(56) References Cited

U.S. PATENT DOCUMENTS

| | | | |
|---|---|---|---|
| 6,549,594 B1 * | 4/2003 | Chen et al. | 375/355 |
| 6,567,482 B1 * | 5/2003 | Popovic' | 375/343 |
| 6,963,600 B1 | 11/2005 | Fan et al. | |
| 7,120,132 B2 | 10/2006 | Choi et al. | |
| 7,426,175 B2 | 9/2008 | Zhuang et al. | |
| 2002/0009129 A1 | 1/2002 | Choi et al. | |
| 2002/0052208 A1 * | 5/2002 | Porcino | 455/456 |
| 2002/0154680 A1 * | 10/2002 | Hao et al. | 375/141 |
| 2002/0181509 A1 * | 12/2002 | Mody et al. | 370/480 |
| 2004/0066802 A1 | 4/2004 | Ro et al. | |
| 2004/0161046 A1 | 8/2004 | Schott et al. | |
| 2005/0226140 A1 | 10/2005 | Zhuang et al. | |

FOREIGN PATENT DOCUMENTS

| | | |
|---|---|---|
| CN | 1140369 | 1/1997 |
| CN | 1264964 A | 8/2000 |
| CN | 1297628 A | 5/2001 |
| CN | 1553621 A | 12/2004 |
| CN | 1691659 | 11/2005 |
| EP | 0760564 A2 | 3/1997 |

(Continued)

OTHER PUBLICATIONS

Liao Jingyi et al., "The effect of filling unique words to guard interval for OFDM system", IEEE 802.16 Broadband Wireless Access 2002, pp. 1-8 XP002532811.

(Continued)

*Primary Examiner* — Gary Mui
*Assistant Examiner* — Richard K Chang
(74) *Attorney, Agent, or Firm* — Slater & Matsil, L.L.P.

(57) ABSTRACT

A method for uplink synchronization of a first transceiver and a second transceiver in a multi-user cellular communication system having communication resources divided into communication channels. The method includes the following steps. A first signature sequence is transmitted from the second transceiver to the first transceiver, where the signature sequence is selected from a first set of signature sequences. In the first transceiver, the received signal is correlated with at least one signature sequence from a second set of signature sequences to estimate the time of arrival of the signature sequence to synchronize transmission between the second transceiver and the first transceiver. In transmitting the first signature sequence from the second transceiver to the first transceiver, the first signature sequence constitutes at least part of a zero-correlation zone sequence.

31 Claims, 5 Drawing Sheets

FOREIGN PATENT DOCUMENTS

| | | |
|---|---|---|
| EP | 1 143 651 A1 | 10/2011 |
| JP | 2001-94466 A | 4/2001 |
| JP | 2002-536870 A | 10/2002 |
| JP | 2002-539667 A | 11/2002 |
| JP | 2004-502324 A | 1/2004 |
| JP | 2005-175849 A | 6/2005 |
| JP | 2006-5435 A | 1/2006 |
| WO | 9941845 | 8/1999 |
| WO | WO 00/45530 | 8/2000 |
| WO | 0054424 | 9/2000 |
| WO | WO 00/54424 | 9/2000 |
| WO | WO 02/01742 A1 | 1/2002 |
| WO | 2005/104412 A1 | 11/2005 |

OTHER PUBLICATIONS

Zhuang et al., "GCL-based Preamble Design for 1024,512 and 128 FFT sizes in the OFDMA PHY Layer", IEEE C80216e-04/241r1; 2004: pp. 1-29.

International Search Report & Written Opinion of the International Searching Authority, PCT/CN2006/000077, dated Aug. 10, 2006, 6 pages.

3GPP TS 25.213 V6.1.0 (Dec. 2004), "$3^{rd}$ Generation Partnership Project; Technical Specification Group Radio Access Network; Spreading and modulation (FDD) (Release 6)," dated Dec. 2004, 32 pages.

3GPP TS 25.101 V6.8.0 (Jun. 2005), "$3^{rd}$ Generation Partnership Project; Technical Specification Group Radio Access Network; User Equipment (UE) radio transmission and reception (FDD) (Release 6)," dated Jun. 2005, 118 pages.

3GPP TR 25.814 V2.0.1 (Nov. 2005), "$3^{rd}$ Generation Partnership Project; Technical Specification Group Radio Access Network; Physical Layer Aspects for Evolved UTRA (Release 7)," dated Nov. 2005, 72 pages.

Chinese Office Action, CN Application No. 2006800462019, dated Jul. 3, 2009, 14 pages.

Japanese Notice of Reasons for Rejection, JP Application No. 2008-550604, dated Jul. 5, 2011, 5 pages.

3GPP TSG RAN WG1 Meeting #42bis, RI-051058, "RACH Preamble Design," Agenda Item: 8.2, Texas Instruments, San Diego, CA, US, dated Oct. 10-14, 2005, 7 pages.

3GPP TSG RAN WG1 Meeting #42bis, RI-051058, "RACH Preamble Design," Texas Instruments, dated Oct. 10-14, 2005, Power Point presentation, 10 pages.

Fan, P, et al., "A Novel Interference-free CDMA System," The $10^{th}$ International Symposium on Person Indoor and Mobile Radio Communications, PIMRC'99, 1999, pp. 440-444.

Popovic, B.M., "New Complex Space-Time Block Codes for Efficient Transmit Diversity," 2000, IEEE, pp. 132-136.

Popovic, B.M., "Generalized Chirp-Like Polyphase Sequences with Optimum Correlation Properties," 1992, IEEE, pp. 1406-1409.

3GPP TSG RAN WG1 #43, "Optimum family of spectrum-shaping functions for PAPR reduction in SC-FDMA, " Source: Huawei, Agenda Item: 8.1, R1-051434, Nov. 7-11, 2005, 7 pages.

3GPP TSG RAN WG1 Meeting #43, "Pilot structure of SC-FDMA in Evolved UTRA uplink," Source: Huawei, Agenda Item: 8.1, R1-051432, Nov. 7-11, 2005, 3 pages.

Japanese Decision of Rejection, Application Number: 2008-550604, Mailed: Jan. 31, 2012, 3 pages.

First Chinese Office Action, Application No. 201110200872.9, dated Mar. 26, 2012, 13 pages.

European Office Action received in European Application No. 06705498.1, mailed May 9, 2012, 4 pages.

\* cited by examiner

METHOD AND SYSTEM FOR SYNCHRONIZATION IN COMMUNICATION SYSTEM

CROSS REFERENCE TO RELATED APPLICATIONS

This application is a Continuation of PCT/CN2006/000077 filed Jan. 18, 2006, which is incorporated by reference in its entirety herein. The PCT application published in English as WO2007/082409 A1.

FIELD OF THE INVENTION

The disclosure relates to the field of radio communication systems, and in particular to a method for uplink synchronization of a base station and a mobile terminal in a multi-user cellular communication system.

BACKGROUND OF THE INVENTION

In most mobile communication systems of today, there are specific requirements regarding synchronization of a base station and a mobile terminal in order to secure a correct data transmission. Examples of such systems are the Universal Terrestrial Radio Access (UTRA) and Evolved UTRA.

In Evolved UTRA, Single-Carrier Frequency Division Multiple Access (SC-FDMA) may be used as multiple access scheme for the uplink communication. The transmission scheme of SC-FDMA is the so-called Discrete Fourier Transform-spread Orthogonal Frequency Domain Multiplexing (DFT-spread OFDM), which can be seen as OFDM with pre-coding. Whereas OFDM, which produces a multi-carrier signal, has a high peak-to-average ratio (PAPR), the DFT pre-coding gives a single-carrier signal with lower PAPR. The low PAPR serves to extend the coverage and to reduce the battery drain in the mobile.

In DFT-spread OFDM, cyclic prefix is used to achieve equalization in the frequency domain. However, a requirement for successful equalization in DFT-spread OFDM, as well as in OFDM, is that the signals transmitted from all mobile terminals in the cell are synchronized in such a manner that the delay spread of the signal plus the spread in the time of arrival is less than the duration of the cyclic prefix. Therefore, it is required that each transmitting mobile terminal is synchronized to within a fraction of the duration of the cyclic prefix before it can transmit data.

In Evolved UTRA, synchronization is performed both in uplink and downlink. In one step of the synchronization, downlink synchronization, the mobile terminal synchronizes (or locks) to the carrier frequency and the frame timing of the base station. This synchronization, however, is not sufficient to ensure that the base station can properly receive the signals from the mobile terminal, since mobile terminals may be located at various distances relative to the base station. Consequently, further synchronization, uplink synchronization, is needed since the distance between a base station and a mobile terminal, and hence the round trip time, is in general unknown.

In Evolved UTRA, a random access channel (RACH) supports uplink synchronization of the mobile terminals. RACH in Evolved UTRA is contention-based, i.e. any mobile terminal within the cell may transmit on the resource allocated to RACH. Consequently, several mobile terminals may attempt to transmit synchronization signals simultaneously, and in order to reduce the risk that the base station fails to distinguish signals from different mobile terminals, a set of signature sequences is provided, wherein each mobile terminal randomly selects one signature sequence.

In UTRA and Evolved UTRA a binary pseudo-random sequence generated by a shift register is modulated by 16-bit Hadamard sequences to produce these signature sequences. Even though these signature sequences in many instances provide good correlation properties, there still exists a need for enhanced detection capabilities to detect a specific signature in presence of other simultaneous signatures, especially at low SIR values.

SUMMARY OF THE INVENTION

It is an object of the disclosure to provide a method and a system for uplink synchronization in a multi-user cellular communication system, which has enhanced capabilities to detect a single signature in presence of a number of other simultaneous signatures, especially at low signal-to-interference ratio (SIR) values, as compared to the known prior art.

In accordance with the present disclosure, a signature sequence is transmitted from a second transceiver to a first transceiver. The signature sequence is selected from a first set of signature sequences, and the received signal is correlated with at least one signature sequence in the first transceiver to estimate the time of arrival to synchronize transmission between the second transceiver and the first transceiver. The invention is characterized by a signature sequence comprising at least part of a zero-correlation zone sequence. The signature sequence may be selected from a group of signature sequences.

The invention provides the advantage that, apart for maintaining favourable features of prior art signature sequences,—such as good autocorrelation properties for allowing accurate timing estimation, good cross-correlation properties to allow for accurate timing estimation of different simultaneous and partially synchronized signature sequences, and a small peak-to average power ratio,—zero, or substantially zero cross-correlation for synchronous and simultaneous signature sequences is achieved, which substantially improves the detection probability of a particular signature sequence since the sequences are easily distinguished from each other. The improved detection capabilities provide the further advantage that in situations with more than one simultaneously transmitted signature sequence, less retransmissions have to occur due to missed detections, and, accordingly, system resources are more efficiently used. Further, as it is becoming more and more important to obtain a fast access to the network and to be able to quickly transmit data using high power, the improved detection capabilities allow faster detection of a specific mobile terminal that wishes to transmit data, which also facilitates interoperability with the IP protocol.

The use of signature sequences according to the present invention further has the advantage that, even if the signal level of one signature sequence is strong while the signal level of a substantially simultaneous signature sequence is considerably weaker, e.g., due to distance, shadowing or (perhaps most probably) fast fading, the probability of a correct detection is substantially improved.

The zero-correlation zone of said first signature sequence may be of a length such that it substantially corresponds to the maximum expected delay of a transmission from the second transceiver to the first transceiver. Further, the received signal may be correlated with at least one signature sequence for a predetermined number of delays of the signal, e.g., corresponding to the maximum expected delay. The delay may be determined using the cell size. This approach has the advantage that a desired length of the zero-correlation zone may be obtained, whereby the number of signature sequences may be varied to provide the required zero-correlation zone length. The more sequences, the shorter zero-correlation zone.

A set of matched filters may be used in the first transceiver to correlate the received signal with at least one signature sequence or each signature sequence in a group of signature sequences for a predetermined number of delays of the signals, whereupon a peak output from each matched filter is detected, and after which the detected peak output from each filter is used to estimate the time of arrival to synchronize the transmission from the second transceiver. This has the advantage that the correlation may be performed in a simple manner.

The signature sequences may be taken from a set of Generalized Chirp-Like sequences obtained by modulating a Zadoff-Chu sequence with an orthogonal set of complex sequences. For example, the orthogonal set of modulating sequences is a set of rows and/or columns of a discrete Fourier transform matrix, or a set of rows and/or columns in a Hadamard matrix. This has the advantage that the signature sequences may be accomplished in a simple manner.

BRIEF DESCRIPTION OF THE DRAWINGS

The invention will become more readily apparent from the Detailed Description of the Invention, which proceeds with reference to the drawings, in which.

DETAILED DESCRIPTION OF EXEMPLARY EMBODIMENTS

The present invention will now be described more in detail in relation to a communication system employing DFT-spread OFDM.

Figure 1:
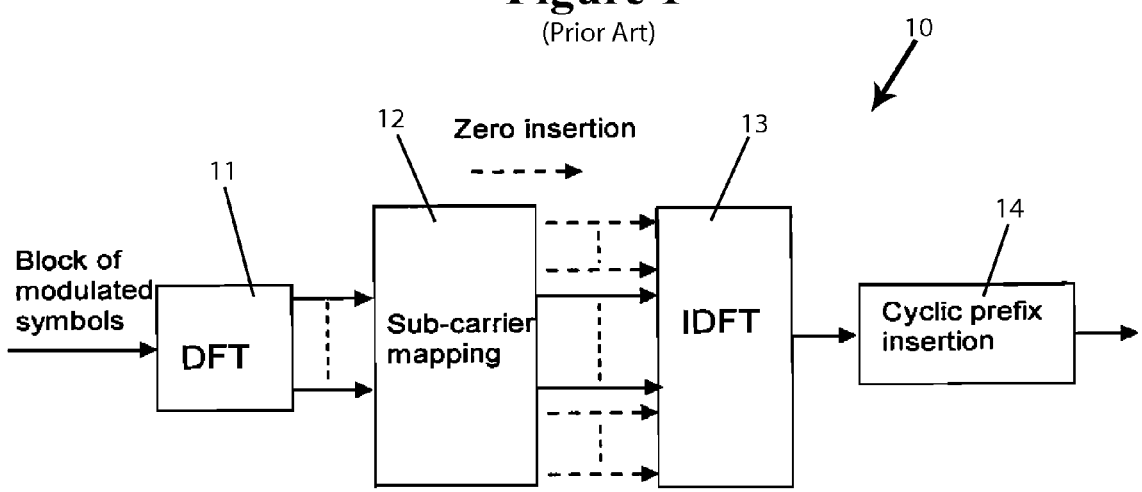
FIG. 1 shows a conventional DFT-spread OFDM transmitter structure for synchronized data transmission.

In FIG. 1 is shown a basic transmitter 10 for DFT-spread OFDM. Blocks of M complex modulated symbols $x_n$, $n=0, 1, \ldots, M-1$, are transformed by a DFT 11 which results in M coefficients $X_k$:

$$X_k = \sum_{n=0}^{M-1} x_n e^{-j2\pi \frac{nk}{M}}, k = 0, 1, \ldots, M-1. \quad (1)$$

The output from the DFT is mapped by a sub-carrier mapping module 12 on equidistant sub-carriers $l_k = l_0 + kL$, where $l_0$ is a frequency offset, and L is an integer larger than or equal to 1. All other inputs to the N-point Inverse Discrete Fourier Transform (IDFT) are set to zero.

The output of the IDFT 13, $y_n$, is given by $$y_n = \frac{1}{M} \sum_{k=0}^{M-1} X_k e^{j2\pi \frac{nl_k}{N}}, n = 0, 1, \ldots, N-1 \quad (2)$$

Finally, to avoid inter-symbol interference (ISI) and inter-channel interference (ICI), a cyclic prefix inserter 14 inserts a cyclic prefix, i.e., a copy of the last portion of each OFDM symbol is inserted before the beginning of the same symbol. A time window may be applied after the cyclic prefix to reduce out-of-band emissions.

The cyclic prefix enables equalization in the frequency domain. However, a requirement for successful equalization in DFT-spread OFDM, as well as OFDM, is synchronization of the transmitted signals from all mobile terminals in a cell so that the delay spread of the signal plus the spread in the time of arrival is less than the duration of the cyclic prefix. It is therefore required that the mobile terminal is synchronized to within a fraction of the duration of the cyclic prefix before it can transmit data.

As stated above, in a first synchronization step in a DFT-spread OFDM system, the mobile terminal uses the carrier frequency and frame timing of the base station to perform synchronization. Although this synchronization step ensures that the downlink synchronized mobile can receive the signals from the base station, further synchronization is needed to compensate for the, generally unknown, distance between the mobile terminal and the base station so as to ensure that the base station can properly receive the signals from the mobile terminal. A mobile terminal far away from the base station will receive downlink signals with a larger delay than a mobile terminal close to the base station, and the transmitted signals in uplink will take longer time to propagate to the base station for this mobile terminal, as compared to signals from a mobile terminal closer to the base station. Once the base station has estimated the time it will take for a signal transmitted from the mobile terminal to reach the base station, the base station may transmit a command to the mobile terminal to adjust its transmit timing so that transmissions from various mobile terminals arrive at the base station at desired points in time.

An important aspect of the second step of synchronization is that the mobile terminals have already synchronized the reception of the downlink signal and that all variations in time of arrival at the base station of the signals transmitted from the mobile terminals are due to the different round-trip times. Since the cell size is known, the range of time of arrivals is known a priori in the base station.

In Enhanced UTRA, the random access channel (RACH) in uplink supports uplink synchronization of mobile terminals. It is mapped onto certain resources in time (access slots) and frequency. In each access slot there should be a guard interval, so that all the transmitted signals arrive within the allocated time and do not interfere with data transmissions no matter where the transmitting mobile terminal is located in the cell. Since the RACH in Evolved UTRA is contention-based, i.e. any mobile terminal within the cell may transmit on the time-frequency resource allocated to RACH, more than one mobile terminal may simultaneously, or substantially simultaneously, attempt to transmit synchronization signals. In order to reduce the risk that the base station fails to distinguish the signals from the different mobile terminals, a set of signature sequences is used, wherein each mobile terminal, normally in a random fashion, selects one signature sequence out of the set of signature sequences.

Since successful detection of the signature sequence is necessary for the mobile terminal to access the network, it is important that the transmitted signature sequence requires a low power amplifier back-off to allow for high average transmit power and hence good coverage.

The signature sequences in uplink should have the following properties:

good autocorrelation properties to allow for accurate timing estimation, good cross-correlation properties to allow for accurate timing estimation of different simultaneous and partially synchronized (i.e. downlink synchronized) signature sequences, wherein the phase difference is limited by the maximum round-trip time in the cell, zero cross-correlation for synchronous and simultaneous signature sequences, and a small peak-to-average power ratio.

These properties are satisfied to a large extent by the RACH signatures in UTRA used today, and, at least partially, these also constitute the current suggestion for Evolved UTRA. In UTRA, a binary pseudo-random sequence generated by a shift register is modulated by 16-bit Hadamard sequences to produce the signature sequences. Further, rotation of the signal constellation is applied to reduce the PAPR of the signal.

The modulation using Hadamard sequences allows for complexity reduction in the receiver: For each delay, the received signal is multiplied element-wise with the complex conjugate of the pseudo-random scrambling sequence. Every $16^{th}$ sample is summed to produce a vector of 16 elements. Finally, the Hadamard sequences are correlated with the received vector to produce correlation outputs of the signature sequences.

However, some of the properties of these known signature sequences, such as mutual cross-correlation, i.e. the detection probability of a single signature in presence of one or more other simultaneous signatures could be better, especially at low SIR values.

According to the present invention, the above problem is overcome by using zero-correlation zone sequences, i.e., a downlink synchronized mobile terminal transmits a signal, which is a signature sequence from a set of zero-correlation zone sequences.

A set of M sequences $\{d_x(k)\}$, $x=0, 1, \ldots, M-1$, $k=0, 1, \ldots, N-1$, of length N is said to be a set of zero-correlation zone sequences if all the sequences in the set satisfy the following autocorrelation and cross-correlation properties:

The periodic autocorrelation function $$\sum_{k=0}^{N-1} d_x(k)d_x^*((k+p) \bmod N)$$

is zero for all p such that $0<|p|\leq T$ and the periodic cross-correlation function $$\sum_{k=0}^{N-1} d_x(k)d_y^*((k+p) \bmod N)$$

is zero for all p such that $|p|\leq T$ (including p=0). T is the length of the zero-correlation zone.

In an exemplary embodiment of the invention, the set of zero correlation zone sequences is constructed by using Generalized Chirp-Like (GCL) sequences. A GCL sequence $\{c(k)\}$ is defined as $$c(k)=a(k)b(k \bmod m), k=0, 1, \ldots, N-1. \quad (3)$$

where $N=sm^2$, s and m are positive integers, $\{b(k)\}$ is any sequence of m complex numbers of unit magnitude, and $\{a(k)\}$ is the Zadoff-Chu sequence $$a(k) = \begin{cases} W_N^{k^2/2+qk}, & N \text{ even} \\ W_N^{k(k+1)/2+qk}, & N \text{ odd} \end{cases}$$

$k=0, 1, \ldots, N-1$, q is any integer, (4)

where $W_N=\exp(-j2\pi r/N)$ and r is relatively prime to N (i.e., the greatest common divisor of r and N equals 1).

Any GCL sequence has an ideal periodic autocorrelation function, i.e. it is a Constant Amplitude Zero Auto-Correlation (CAZAC) sequence.

If the two GCL sequences $c_x(k)$ and $c_y(k)$ are defined by using the same Zadoff-Chu sequence $\{a(k)\}$ but different, arbitrary modulation sequences $\{b_x(k)\}$ and $\{b_y(k)\}$, it can be shown (in a manner similar to what is disclosed in B. M. Popovic, "New Complex Space-Time Block Codes for Efficient Transmit Diversity," IEEE 6th Int. Symp. on Spread-Spectrum Tech. & Appl (ISSSTA 2000), NJ, USA, pp. 132-136, September 2000.) that the periodic cross-correlation is zero for all time shifts p in the delay zones $0<|p|<sm$, $sm<|p|<2sm$, $\ldots$, $(m-1)sm,<|p|<sm^2$.

Thus, if the above two modulation sequences are orthogonal, the resulting GCL sequences will be not just orthogonal, but also will have a zero-correlation zone of length sm-1.

Based on this property, the set of m zero correlation zone sequences can be defined as the set of GCL sequences obtained by modulating a common Zadoff-Chu sequence $\{a(k)\}$ with m different orthogonal modulation sequences $\{b_i(k)\}$, $i=0, 1, 2, \ldots, m-1$, $k=0, 1, 2, \ldots, m-1$. The periodic cross-correlation between any two sequences from the set will be zero for all the delays between $-sm$ and $+sm$.

The sequences from the set of zero-correlation zone sequences are used as the synchronization signatures. Although the matched filters for such signatures actually calculate the aperiodic cross-correlations, it is expected that the ideal periodic cross-correlation properties in the search window will be to a large extent preserved. The reason is that for delays in the search window that are much smaller than the length of the sequence, the sums for the aperiodic and periodic cross-correlation values only differ in a small number of terms. This expectation is confirmed by numerical evaluations, as will be shown later.

For the GCL sequences, possible choices for the selection of orthogonal modulation sequences would, for example, be either the sets of Hadamard sequences or Discrete Fourier Transform (DFT) sequences. The set of DFT sequences is defined as $$b_i(k)=W_m^{ik}, i,k=0, 1, \ldots, m-1, \quad (5)$$

while the set of Hadamard sequences is defined as the rows (or columns or possibly both rows and columns) in a m×m Hadamard matrix, defined as follows: A Hadamard matrix $H_m$ of order m, consists of only 1s and $-1$s and has the property $H_m H_m^T = mI$ where I is the identity matrix and $^T$ denotes transpose. Hence, the Hadamard sequences are orthogonal. For $m=2^n$, where n is a positive integer, Hadamard sequences can be defined as $$b_i(k) = (-1)^{\sum_{l=0}^{m-1} i_l k_l}, i, k = 0, 1, \ldots, m-1, \qquad (6)$$

where $i_l$, $k_l$ are the bits of the m-bits long binary representations of integers i and k.

The actual numbers m and N can be selected to fit into the requirements of the Evolved UTRA. For a given length of the sequence, there is then a trade off between the length of the zero-correlation zone and the number of signatures that can be provided.

For example, for a 1.25 MHz bandwidth in Evolved UTRA, an exemplary time available for signature sequence transmission is 500 μs, and with a guard time of about 110 μs, the duration of the sequence is 390 μs. Assuming a sampling rate of, e.g., 1.024 MHz, it follows that the length of the sequences is $N=400=sm^2$.

The cell size is generally known, and thereby the maximum time difference between signals from two mobile terminals in the cell (i.e., the sum of the additional propagation times to and from the one mobile terminal relative to the other). Advantageously, the zero-correlation zone length is adapted to this time difference, i.e. to obtain a low correlation for all possible time differences up to the maximum possible difference. If, for example, the cell size is 14 km, the maximum travel time for a signal corresponds to 96 symbols with the above presumptions. The low cross-correlation in this delay range will, according to the above, be ensured if sm=100, so it follows that m=4, and s=25 (a larger m would result in a shorter, and thereby unsatisfactory, zero-correlation zone length). For simplicity, we choose q=0 in equation (4). It is to be understood, however, that other values of q may be used. A non-zero q will cause a shift in the sequence. Hence, there are 4 different signature sequences of length 400.

Figure 2:
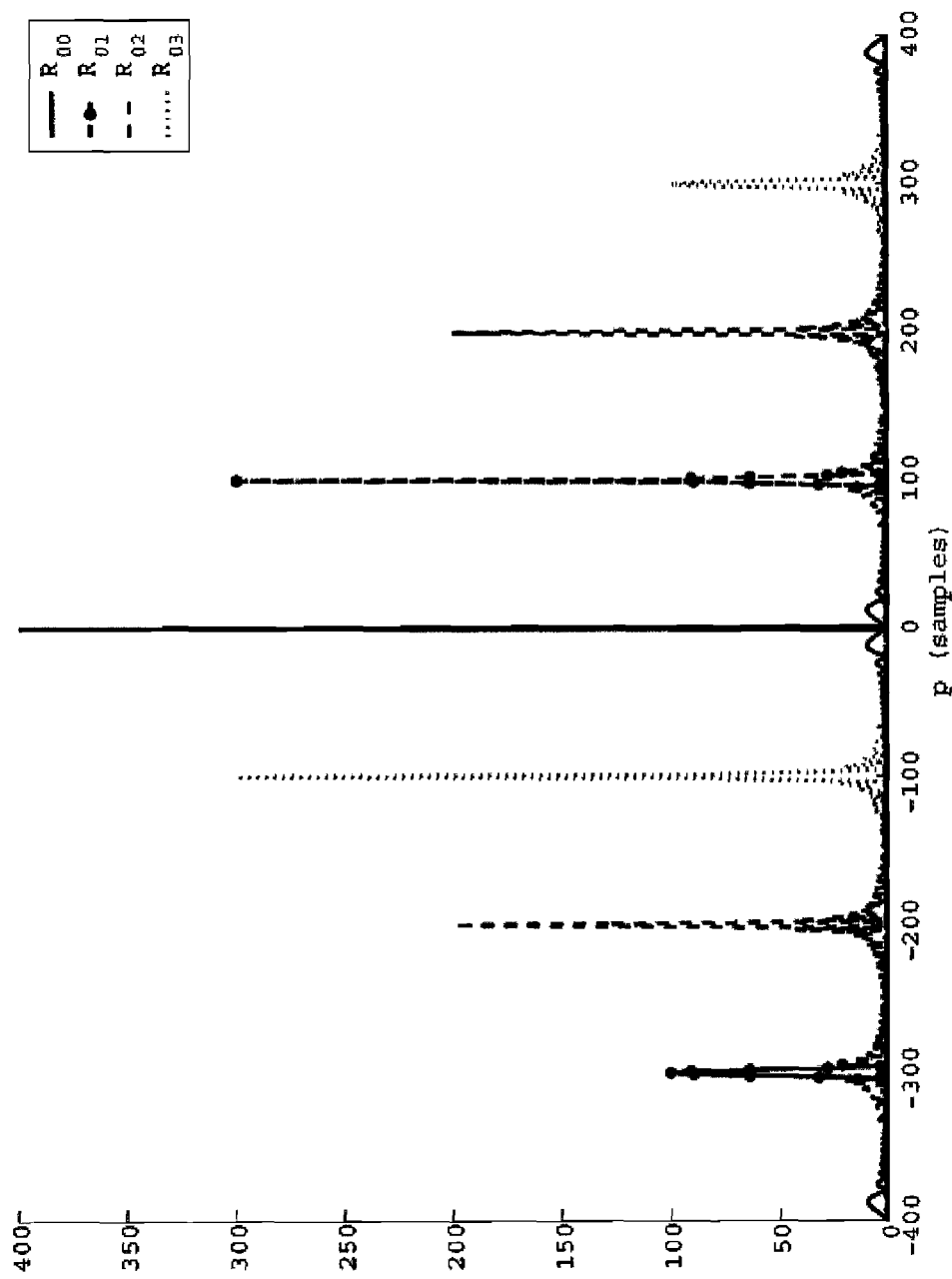
FIG. 2 shows absolute values of the autocorrelation and cross-correlation functions of exemplary signature sequences according to the present invention.

In FIG. 2 is shown the absolute values of the autocorrelation and cross-correlation functions of the sequences with the received signal.

The amplitude of the aperiodic cross-correlation function $$R_{xy}(p) = \sum_{k=0}^{N-1-p} c_x(k) c_y^*(k+p),$$

where p is the delay and "*" denotes complex conjugate, is shown in FIG. 2 for the DFT-modulated GCL sequence, with N=400 (s=25 and m=4), and r=1.

Figure 3:
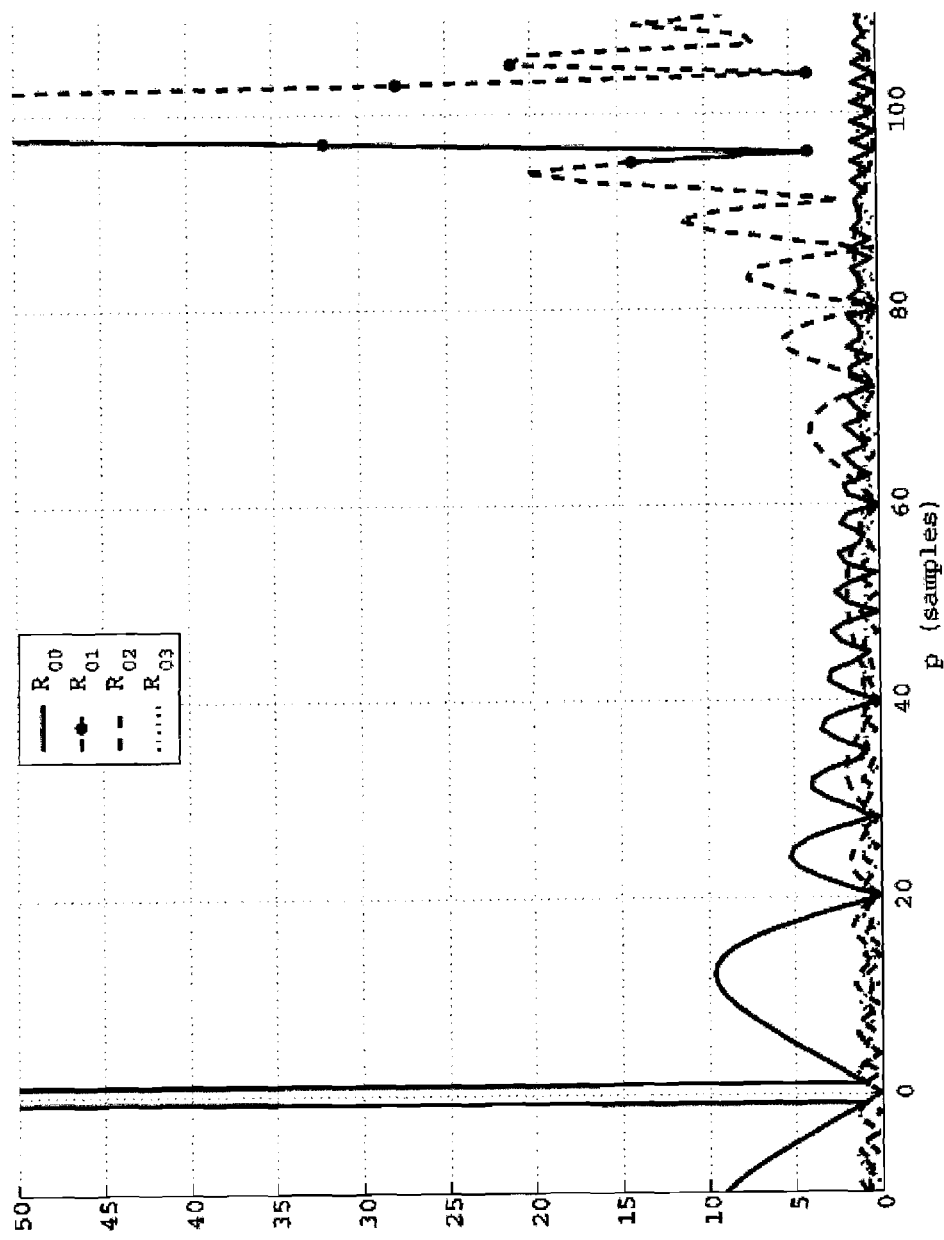
FIG. 3 shows a magnified portion of the graph in FIG. 2 in greater detail.

A set of Hadamard-modulated GCL sequences has auto-correlation and cross-correlation functions similar to the ones shown in FIG. 2. The peaks of the cross-correlation functions are located near multiples of sm=100. The peaks exhibit a certain broadening, i.e. the correlation values close to multiples of sm have considerable non-zero values, which are not otherwise present for the periodic cross-correlation functions. However, for the given parameters, the cross-correlation functions do not exceed 20 for delays less than 96. Accordingly, for a cell of size 14 km, only the portion of the plot up to p=96 is of interest, and in this interval the result of the correlation is unambiguous. The portion of the plot in FIG. 2 showing delays from 0 to 100 is shown more in detail in FIG. 3.

The actual synchronization is performed by the base station using a set of matched filters to correlate the received signal with the signature sequences in the set of signature sequences for all delays within the search window, and detecting a peak output from each matched filter. A threshold is used to reduce the probability of false detection, i.e., the threshold is set to a value such that when the received signal only consists of noise it results in a detection with a certain probability, e.g. 0.0001.

The detected peak output from each filter is then used to estimate the time of arrival, i.e. the delay, to synchronize the transmission from the mobile terminal.

The comparison signal in the base station may be non-periodic, i.e., consist of only one period. Alternatively, this signal may be periodic or consist of one period plus a portion of a period on either or both sides. If a periodic signal is used, the threshold must be increased since the probability of an erroneous detection increases. On the other hand, the robustness is increased when more than one signature sequence are present. Further, it is, of course, also possible to extend the signature sequence transmitted by the mobile terminal a portion of a period on either or both sides of the sequence. The length of the additional portion(s) may be determined by the time available for transmitting the signature sequence.

In one embodiment of the present invention, all cells in a system are provided with the same number of signature sequences, preferably this number is selected based on the largest cell in the system. As is apparent, however, the specific signature sequences may vary from cell to cell. This has the advantage that when a mobile terminal is present at the border between two cells, it can be determined which cell it tries to connect to. If neighbouring cells have the same set of signature sequences, two or more base stations may attempt to answer the call from the mobile terminal. On the other hand, it may be determined which base station provides the best signal quality, and thereby which base station should answer. As also is apparent from the above, however, it is also possible to have different sets of signature sequences in different cells. The various sets of signature sequences can easily be obtained by varying r. Which r value to use may be transmitted to the mobile terminal, which thereby can produce the set of signature sequences according to the equations above. Further, if the cell size is smaller, the number of signature sequences may be increased with maintained sequence length. If, for example, the cell size is 7 km, the number of delay steps needed is only half of the above example. Accordingly, m can be set to 7 and s to 8. This will result in a signature sequence of length 392, and 7 signature sequences fulfilling the requirements of the cell size, i.e. during sm−1=55 steps. In this example, the above guard time has been maintained. It is, however, also possible to reduce the guard time in smaller cells and thereby enable longer signature sequences, and consequently also an increased number of sequences.

The detection performances of these proposed signature sequences, or preambles, have been evaluated by link-level simulations. The truncated WCDMA RACH preamble has been used as a reference with modulating Hadamard sequences that are 4 bits long, instead of 16 bit long sequences, to keep the same number of signature sequences as for the proposed sequences. The number of receive antennas is two and correlations from the two antennas at the same delay are combined non-coherently, i.e. the absolute values of the squared matched filter outputs from the two antennas at the same delay are added. The number of trials is 100000.

Two scenarios have been simulated. In both scenarios the detector correlates the received signal with all possible signature sequences in the search window. A threshold is set to give a false alarm probability of 0.0001 for a signature sequence at a single delay. Missed detection is declared if the transmitted signature sequence is not detected.

In the first scenario, only one preamble is transmitted in a time-frequency resource for RACH. The delay is randomly distributed within the search window, i.e., in this example, ranging from 0 to 96 samples, corresponding to randomly distributed mobiles in the cell.

In the second scenario, two or more different signature sequences from the same set are transmitted in the same time-frequency resource. The signal-to-noise ratio (SNR) of signature S1 is fixed (SNR=−15 dB) and the other interfering signatures are transmitted with various power offsets to signature 1. However, all interfering signatures are transmitted with the same power. All signatures are transmitted with independent random delays within the search window. The probability of missed detection of the weaker signal, signature S1, is recorded. The SIR is the ratio of the power of signature S1 to the power of any of the interfering signatures.

Figure 4:
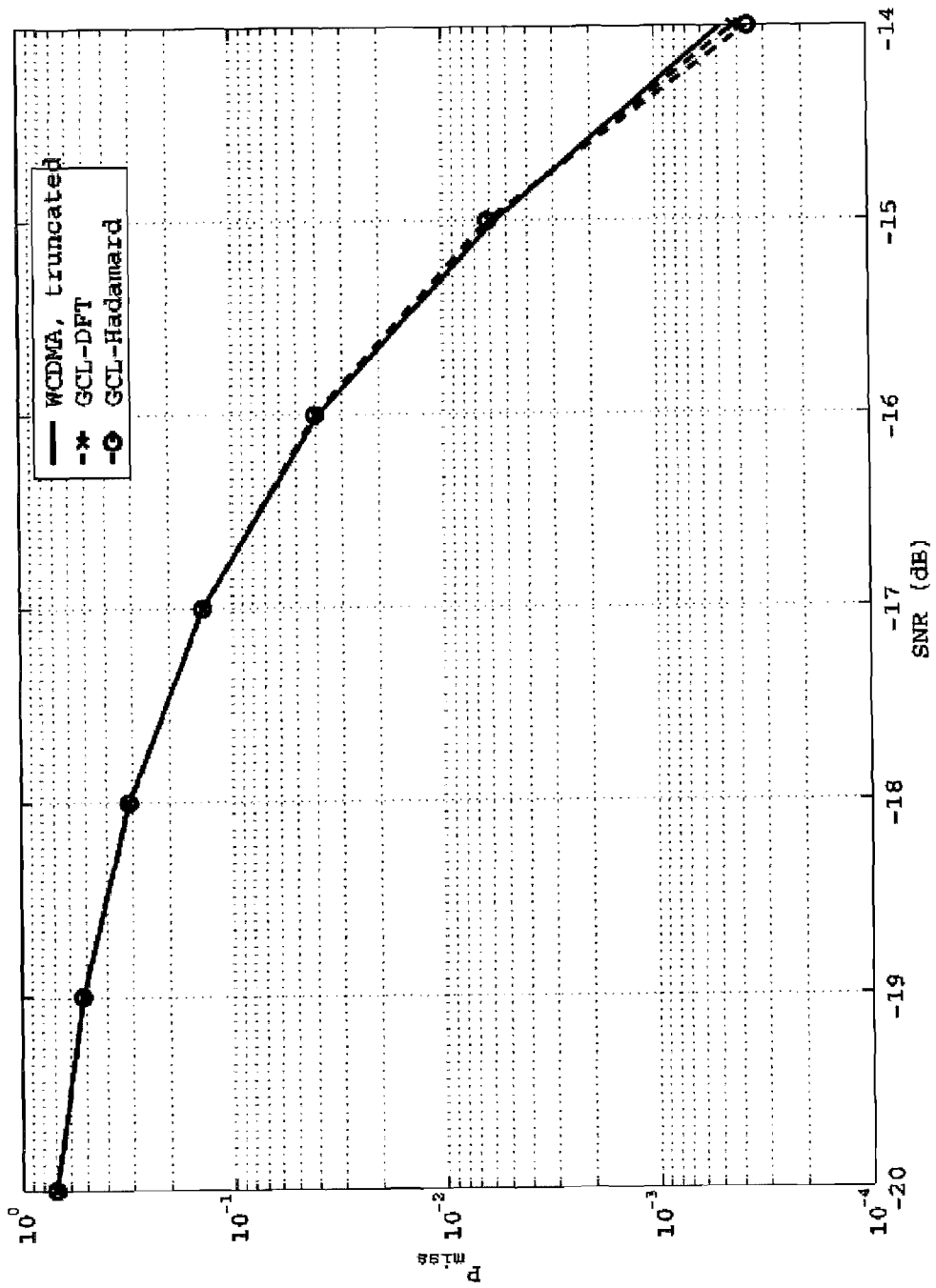
FIG. 4 shows the probability of missed detection for one transmitted sequence according to the present invention.
Figure 5:
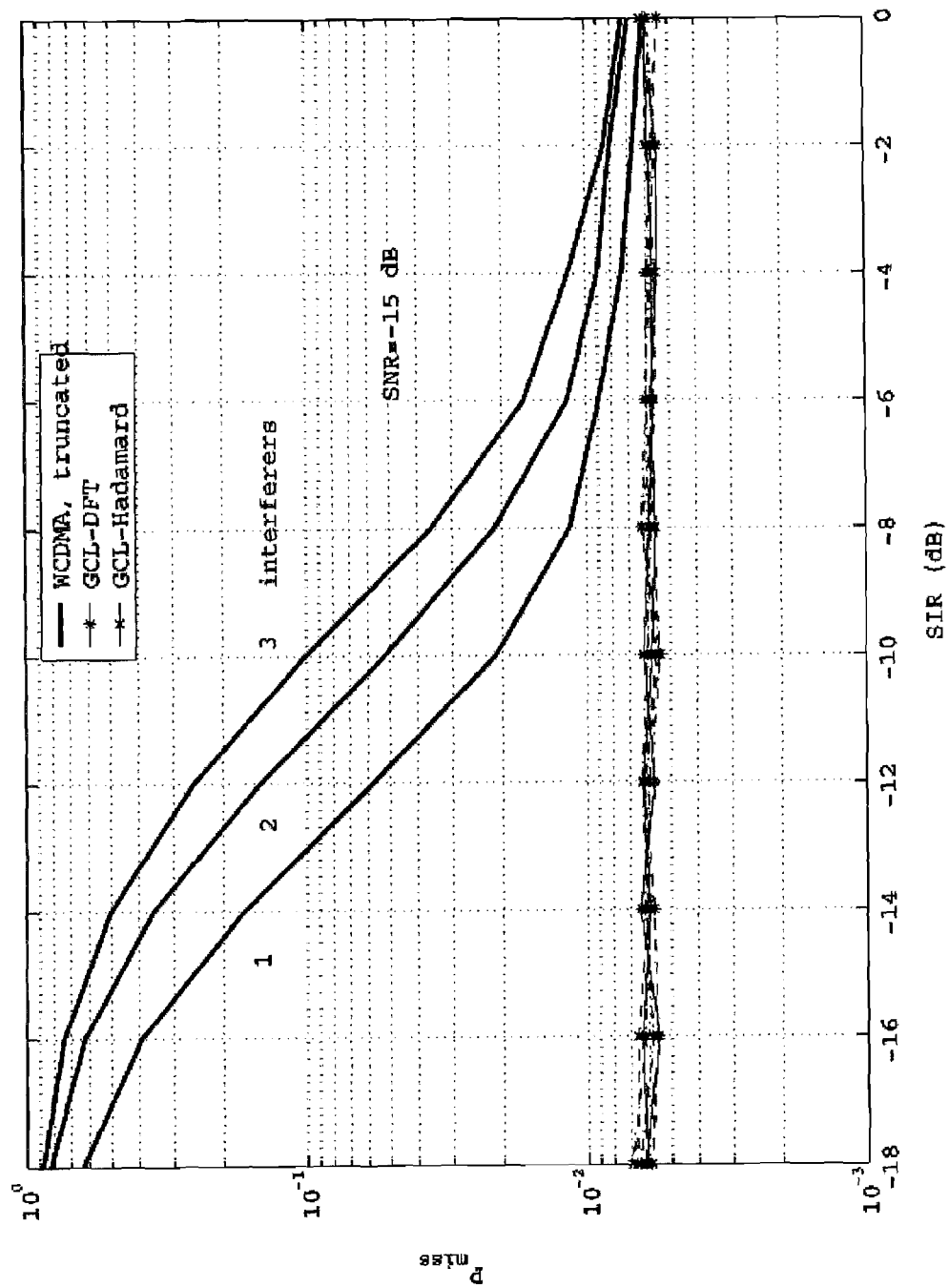
FIG. 5 shows the probability of missed detection for a transmitted sequence in the presence of one or more other transmitted sequences according to the present invention.

Simulation results are shown for scenarios 1 and 2 in FIGS. 4 and 5, respectively. In FIG. 4, the probability of missed detection for one transmitted sequence is shown, and in FIG. 5 the probability of missed detection of a transmitted sequence in presence of another transmitted sequence is shown. From FIG. 4 it is clear that there is no difference in the probability of missed detection in the case without an interfering sequence as compared to the prior art. Hence, in this situation, the signature sequences according to the present invention perform as well as the prior art sequences.

Regarding the second scenario, however, with two or more simultaneously, or substantially simultaneously transmitted sequences, the results shown in FIG. 5 clearly demonstrate significantly improved detection performance in the presence of one or several interfering sequences for the set of sequences according to the present invention. For the proposed set of sequences, the detection performance does not change with an increased number of interferers, not even for very low SIR values, whereas for the reference sequences, the performance deteriorates substantially, both as the number of interferers increases, and with decreasing SIR. This substantial difference can, at least partially, be explained by the condition that when a strong signal and a weak signal are simultaneously present, parts of the stronger signal will, during correlation, be interpreted as part of the weaker signal, with an incorrectly calculated delay as result. The use of signature sequences according to the present invention has the advantage that, as can be seen in FIG. 5, even if the signal level of one signature sequence is strong while the signal level of a substantially simultaneous signature sequence is considerably weaker, the probability of a correct detection is substantially improved.

The lower probability of missed detection exhibited for the proposed set of sequences is due to the good cross-correlation properties of the zero-correlation zone sequences, and consequently, the present invention provides a substantial improvement as compared to the prior art. Further, this improvement of the detection probability by the use of zero-correlation zone sequences can allow reduction of the transmitted power for RACH preamble, thereby reducing the overall interference in the system and increased battery life.

Further, in the above description the invention has been described as utilizing full zero-correlation zone sequences. It is, however, also possible to use truncated sequences, i.e, not all of the zero-correlation zone sequences are used. This will reduce the detection probability, however with the advantage that the freedom in selecting number of signature sequences for a particular signature length increases. The truncation may vary with the cell size. In smaller cells a larger truncation may be accepted with maintained satisfactory performance.

As has been disclosed above, the present invention has several advantages. There are, however, other characteristics that have to be considered in order for the system to operate properly. For example, as has been mentioned above, it is important that the transmitted signature sequence requires a low power amplifier back-off to allow for high average transmit power and hence good coverage. Two measures related to the power back-off are the peak-to-average power ratio (PAPR) and the cubic metric (CM).

In the following, the impact of the present invention on these measures will be disclosed.

Let $z(t)$ be the normalized baseband signal, such that its expectation value $E(|z(t)|^2)=1$.

The PAPR at the $99.9^{th}$ percentile is defined as the value x such that the probability that $10\log_{10}(|z(t)|^2) < x$ equals 0.999.

The CM is defined as $$CM=[20\log_{10}((v\_norm^3)_{rms})-20\log_{10}((v\_norm\_ref^3)_{rms})]/1.85 \qquad (7)$$

where v_norm is the normalized voltage waveform of the input signal v_norm_ref is the normalized voltage waveform of the reference signal (12.2 kbps AMR Speech in WCDMA)

Table 1 lists the PAPR values at the $99.9^{th}$ percentile for a reference WCDMA RACH preamble truncated to 400 samples with 4-bit Hadamard modulating sequences, and for the GCL sequences with DFT and Hadamard modulating sequences. Table 2 lists the corresponding CM values.

TABLE 1

| Pulse-shaping filter | PAPR (99.9th percentile) values | | |
|---|---|---|---|
| | WCDMA | GCL-DFT | GCL-Hadamard |
| Sinc | 3.9-5.9 dB | 2.8 dB | 4.5 dB |
| Root-raised cosine, roll-off factor = 0.15 | 2.6-3.4 dB | 3.0 dB | 3.6 dB |

TABLE 2

| Pulse-shaping filter | Cubic metric values | | |
|---|---|---|---|
| | WCDMA | GCL-DFT | GCL Hadamard |
| Sinc | 0.1-0.5 dB | −0.6 dB | 1.4 dB |
| Root-raised cosine, roll-off factor = 0.15 | −0.3 to −0.1 dB | −0.6 dB | 1.1 dB |

In all cases the maximum PAPR value is given over all modulating sequences. The range of values given for the WCDMA RACH preamble is over all scrambling codes. For the GCL sequences, the Zadoff-Chu sequence with r=1 has been used. It is to be understood that this specific example of the value of r only is exemplary. Two different pulse-shaping filters are applied, a simple sinc filter and a root-raised cosine filter with roll-off factor 0.15.

From the tables, it is clear that the DFT-modulated sequence has both lower PAPR and lower cubic metric than the Hadamard-modulated GCL sequence. Furthermore, applying a root-raised cosine filter improves neither PAPR nor the cubic metric of the DFT-modulated sequence.

Finally, the PAPR of the DFT-modulated GCL sequence is essentially as good as the WCDMA sequences with a root-raised cosine filter, while the cubic metric is somewhat better than for the WCDMA sequences. Apparently, it is possible to find sets of zero-correlation zone sequences that allow for a low power back-off.

The invention claimed is:

1. A method for performing an uplink synchronization between a first transceiver and a second transceiver within a cell in a multi-user cellular communication system, the method comprising:
   receiving, by the first transceiver, a signal from the second transceiver for the uplink synchronization, the signal comprising a first signature sequence, wherein said first signature sequence is selected from a first set of signature sequences, and
   correlating, the received signal with a second signature sequence in the first transceiver, the second signature sequence selected from a second set of signature sequences to estimate a time of arrival of said first signature sequence, so as to synchronize a transmission between the second transceiver and the first transceiver,
   wherein said first signature sequence is generated, at least in part, from a sequence with a zero-correlation zone.

2. The method according to claim 1, wherein correlating the received signal with the second signal sequence comprises:
   correlating one or more predetermined number of delays of the received signal with the second signature sequence for calculating one or more amplitudes of aperiodic cross-correlation;
   determining a delay p corresponding to the maximum amplitude of the one or more amplitudes; and
   estimating the time of arrival of said first signature sequence using the delay p, so as to synchronize the transmission between the second transceiver and the first transceiver.

3. The method according to claim 1, wherein the correlating the received signal with the second signal sequence comprises:
   correlating one or more predetermined number of delays of the received signal with the second signature sequence in the first transceiver using a set of matched filters,
   detecting a peak output from each matched filter, and
   using the detected peak output from each filter to estimate the time of arrival of the received signal, so as to synchronize the transmission between the second transceiver and the first transceiver.

4. The method according to claim 1, wherein correlating the received signal with the second signal sequence comprises:
   correlating one or more predetermined number of delays of the received signal with each signature sequence in said second set of signature sequences for calculating one or more amplitudes of aperiodic cross-correlation;
   determining a delay p corresponding to the maximum amplitude of the one or more amplitudes; and
   estimating the time of arrival of said first signature sequence using the delay p, so as to synchronize the transmission between the second transceiver and the first transceiver.

5. The method according to claim 1, wherein each signature sequence in the first and the second set of signature sequences is taken from a set of Generalized Chirp-Like sequences obtained by modulating a Zadoff-Chu sequence with an orthogonal set of complex sequences.

6. The method according to claim 1, wherein said first signature sequence is randomly selected from the first set of signature sequences.

7. The method according to claim 1, wherein said first set of signature sequences and said second set of signature sequences are the same set of signature sequences.

8. The method according to claim 1, further comprising:
   transmitting a reference representing a particular set of signature sequences to the second transceiver, and wherein the reference is used by the second transceiver to retrieve a signature sequence set scheme to be used.

9. The method according to claim 1, wherein said first signature sequence is generated by truncating a sequence with a zero-correlation zone.

10. The method according to claim 1, further comprising:
    performing, by said second transceiver, a downlink synchronization with said first transceiver prior to the uplink synchronization.

11. The method according to claim 1, wherein the second set of signature sequences comprises one or more signature sequences of the first set of signature sequences.

12. The method according to claim 1, wherein the first signature sequence is used as a preamble portion of a signal transmitted by a mobile terminal to a base station over a random access channel.

13. The method according to claim 1, wherein the first signature sequence is used as a portion of a synchronization signal transmitted by a mobile terminal to a base station.

14. The method according to claim 2, wherein the zero-correlation zone of said first signature sequence has a length that substantially corresponds to a maximum expected delay of a transmission from the second transceiver to the first transceiver.

15. The method according to claim 5, wherein the orthogonal set of complex sequences is one of the following:
    a set of rows and/or columns of a discrete Fourier transform matrix, and
    a set of rows and/or columns in a Hadamard matrix.

16. The method according to claim 14, wherein a cell size is used to determine the maximum delay in said correlating step and/or the maximum expected delay of the transmission from the second transceiver to the first transceiver.

17. An apparatus, comprising:
    a transceiver, configured to receive a signal from another transceiver for performing an uplink synchronization, said signal comprising a first signature sequence, wherein said first signature sequence is selected from a first set of signature sequences, and
    a correlator configured to correlate the received signal with a second signature sequence selected from a second set of signature sequences to estimate a time of arrival of said first signature sequence, so as to synchronize a transmission between the other transceiver and the transceiver of the apparatus,
    wherein said first signature sequence is generated, at least in part, from a sequence with a zero-correlation zone.

18. The apparatus according to claim 17, wherein said correlator is further configured to
    correlate one or more predetermined number of delays of the received signal with the second signature sequence for calculating one or more amplitudes of aperiodic cross-correlation,
    determine a delay p corresponding to the maximum amplitude of the one or more amplitudes, and
    estimate the time of arrival of said first signature sequence using the delay p, so as to synchronize the transmission between the other transceiver and the transceiver of the apparatus.

19. The apparatus according to claim 17, wherein the correlator is further configured to:
- correlate one or more predetermined number of delays of the received signal with the second signature sequence using a set of matched filters,
- detect a peak output from each matched filter, and
- use the detected peak output from each filter to estimate the time of arrival of the received signal, so as to synchronize the transmission between the other transceiver and the transceiver of the apparatus.

20. The apparatus according to claim 17, wherein the correlator is further configured to:
- correlate one or more predetermined number of delays of the received signal with each signature sequence in said second set of signature sequences calculating one or more amplitudes of aperiodic cross-correlation,
- determine a delay p corresponding to the maximum amplitude of the one or more amplitudes, and
- estimate the time of arrival of said first signature sequence using the delay p, so as to synchronize the transmission between the other transceiver and the transceiver of the apparatus.

21. The apparatus according to claim 17, wherein said first set of signature sequences and said second set of signature sequences are the same set of signature sequences.

22. The apparatus according to claim 17, wherein the apparatus is a base station.

23. The apparatus according to claim 17, wherein the second set of signature sequences comprises one or more signature sequences of the first set of signature sequences.

24. The apparatus according to claim 17, wherein the first signature sequence is used as a preamble portion of a signal transmitted by a mobile terminal to a base station over a random access channel.

25. The apparatus according to claim 17, wherein the first signature sequence is used as a portion of a synchronization signal transmitted by a mobile terminal to a base station.

26. The apparatus according to claim 18, wherein the zero-correlation zone of said first signature sequence has a length that substantially corresponds to a maximum expected delay of a transmission from the other transceiver to the transceiver of the apparatus.

27. The apparatus according to claim 26, wherein a cell size is used to determine the maximum delay in said correlating step and/or the maximum expected delay of a transmission from the other transceiver to the transceiver of the apparatus.

28. An apparatus within a cell of a multi-user cellular communication system, comprising:
- a unit configured to select a first signature sequence from a first set of signature sequences,
- a transmitter configured to transmit a signal for an uplink synchronization between the apparatus and a receiver, said signal comprising the first signature sequence, so as to enable the receiver to estimate the time of arrival of said first signature sequence by correlating the signal with a second signature sequence selected from a second set of signature sequences, wherein said first signature sequence is generated, at least in part, from a sequence with a zero-correlation zone.

29. The apparatus according to claim 28, wherein the apparatus is a mobile terminal.

30. The apparatus according to claim 28, wherein the first signature sequence is used as a preamble portion of a signal transmitted by a mobile terminal to a base station over a random access channel.

31. The apparatus according to claim 28, wherein the first signature sequence is used as a portion of a synchronization signal transmitted by a mobile terminal to a base station.

* * * * *